(12) United States Patent
Maida

(10) Patent No.: US 6,361,394 B1
(45) Date of Patent: Mar. 26, 2002

(54) LOLLIPOP HOLDER

(76) Inventor: Gloria Maida, 715 Abbey La., Valley Cottage, NY (US) 10989

( * ) Notice: Subject to any disclaimer, the term of this patent is extended or adjusted under 35 U.S.C. 154(b) by 0 days.

(21) Appl. No.: 09/570,624

(22) Filed: May 15, 2000

(51) Int. Cl.[7] .............................................. A63H 33/00
(52) U.S. Cl. ........................ 446/71; 446/81; 446/297; 446/484; 84/95.2; 84/600; 206/6.1
(58) Field of Search ............................. 446/71, 72, 73, 446/75, 76, 81, 142, 268, 297, 484, 485, 491; 40/455, 456, 457; 206/6.1, 566, 542, 451; 220/780; 84/600, 644, 670, 95.1, 95.2, 94.1, 94.2; 116/67 R, 85, 100

(56) References Cited

U.S. PATENT DOCUMENTS

| | | | | |
|---|---|---|---|---|
| 4,947,722 A | * | 8/1990 | Lewis ......................... | 84/95.2 |
| 5,422,429 A | * | 6/1995 | Shih et al. .................... | 84/94.2 |
| 5,696,333 A | * | 12/1997 | Shih ........................... | 84/95.2 |
| 5,779,032 A | * | 7/1998 | Iimura et al. ................. | 206/6.1 |
| 5,973,250 A | * | 10/1999 | Zirille et al. .................. | 84/600 |
| 6,158,588 A | * | 12/2000 | Conti ......................... | 206/457 |

* cited by examiner

Primary Examiner—Jacob K. Ackun, Jr.
Assistant Examiner—Faye Francis
(74) Attorney, Agent, or Firm—Notaro & Michalos P.C.

(57) ABSTRACT

A lollipop holder simulative of other objects encourages sanitary behaviors with animated responses generated by use of the holder. The holder includes a storage compartment for partly used lollipops and a drawer for holding garbage, such as wrappers and sticks. An animated response is generated by opening and closing the compartment and drawer.

5 Claims, 4 Drawing Sheets

LOLLIPOP HOLDER

FIELD AND BACKGROUND OF THE INVENTION

The present invention relates generally to the field of sanitary containers for food and in particular to a new and useful holder for confections such as lollipops simulative of other objects and having sound and visual displays associated with use of the holder.

Lollipop holders are generally known, such as disclosed by U.S. Pat. No. 5,615,941 for a lollipop holder having a lighted portion. A lollipop is held within the holder for use. The lollipop is extended for consumption while still being held by the holder. The holder includes a lamp for illuminating at least a portion of the holder. In one embodiment, the lamp is activated by extending a lollipop from a storage position to a consumption position. However, the holder is not intended to be simulative of other objects.

U.S. Pat. No. 5,681,200 discloses a toy portable telephone having a holder for a lollipop. The lollipop is held above the telephone to resemble an antenna. The telephone can make noises and may be illuminated to simulate a real portable telephone. The telephone has an enclosure for storing the lollipop to prevent contamination. The sounds and light are not generated in response to the lollipop being affixed or removed.

A simulative lunch box for holding a child's lunch and containing an action figure for playing with the lunch box is taught by U.S. Pat. No. 5,074,417. In a preferred embodiment, the lunch box resembles a space ship and control center. An astronaut figure is provided for playing with the lunch box. A button panel is provided on one side, but it is non-functional and is for play only. The lunch box does not have any visual or sound responses to actions by a user.

Other patents disclose different types of candy holders, such as U.S. Pat. No. 5,993,870 for a device used to hold a confectionary product, such as a lollipop, for storing and coating the confectionary product with an edible topping. The holder has an enclosure formed from a handle and a removable top cover. The lollipop is supported inside the enclosure in a stick support. In one embodiment, the holder has a mechanically activated switch for opening and closing the top cover. When the top is open, the coating is prevented from exiting the handle and spilling. The device is not intended to be simulative of another object.

U.S. Pat. No. 5,984,098 teaches a box for candy or other objects which is simulative of an object, such as a jack-o-lantern or a bear face. The candy is placed inside the box and can be retrieved through a mouth or other opening in the simulative box.

A simulative container for candy in the shape of an animal has two halves which are separable along a circular seam is disclosed by U.S. Pat. No. 5,632,377. The container may also be used as a toy.

Other patents teach simulative devices with audio effects, such as the simulative backpack having a built in tape recorder of U.S. Pat. No. 5,897,042 to Sims. The tape recorder is not activated by opening the backpack, and must be activated manually to record or play back messages.

A combined simulative dispenser and garbage receptacle, such as for cat litter, is described in U.S. Pat. No. 5,551,569. The dispenser and receptacle is made to resemble a cat. The dispenser and receptacle does not have any indicators or responses to use of the functional portions.

Known sanitary holders for confectionary products do not include an animated response to use of the holder.

SUMMARY OF THE INVENTION

It is an object of the present invention to provide a simulative holder for a food product which produces an animated response to use of different storage containers in the holder.

Accordingly, a holder for lollipops is provided which resembles another object, having an animated response to the removal of a lollipop from a receptacle of the holder. The animated response is related to the object that the holder simulates. Examples of the simulative form of the holder include a carousel, a boot, a desk telephone, a cellular phone, a camera, a baseball and glove and a cuckoo clock. The animated response may be a light blinking, a sound being emitted from the holder or a physical movement, such as the carousel rotating on its axis, or the cuckoo clock having a bird appear. The response may include a combination of two or three types of response as well, such as blinking lights, music playing and the carousel rotating.

The response may be activated, for example, by an electromechanical switch which changes position when the lollipop is removed from the receptacle.

The holder may include a compartment for receiving a partially consumed lollipop for keeping the lollipop clean and relatively fresh. A further compartment may be provided for holding garbage from a lollipop, such as the stick and wrapper. These compartments may be sliding trays or pivoting drawers which can be opened and closed manually.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

The invention comprises a lollipop holder which simulates another, recognizable object and produces an animated response to the removal of a lollipop or storage of a partly used lollipop or disposal of garbage in the holder. The simulated form of the holder can take on several shapes, some of which are described in greater detail below.

Figure 1:
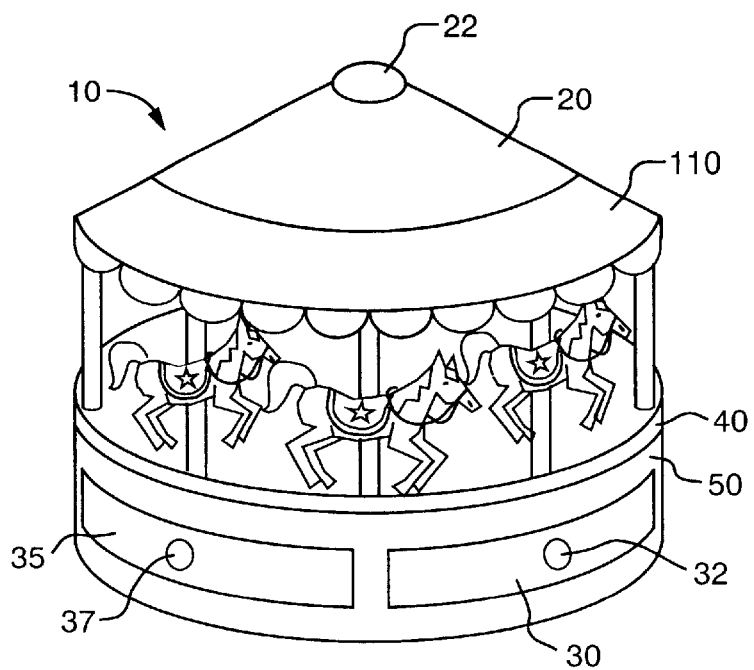
FIG. 1 is a perspective view of a lollipop holder of the invention simulative of a carousel.

Referring now to the drawings, in which like reference numerals are used to refer to the same or similar elements, FIG. 1 shows a lollipop holder 10 of the invention which is simulative of a carousel, or merry-go-round. The holder 10 has a removable lid 20 on its top and two drawers 30, 35 in the base 50. The base 50 rotatably supports the upper portion 40 of the carousel 10.

The lid 20 includes a handle 22 for lifting the lid 20 off of the carousel 10 to expose unused lollipops held inside a chamber (not shown) in the canopy 110 of the carousel 10. The chamber closed by lid 20 is sized to hold one or more unused lollipops.

One of the drawers is a storage drawer 30 for storing partly used lollipops. The other drawer is a garbage drawer 35 for holding garbage from eating a lollipop, such as wrappers and sticks. Each drawer 30, 35 includes a knob or handle 32, 37 for opening the drawer easily by pulling. The drawers 30, 35 can be mounted on slide rails in a known manner, or simply slide in and out of the openings created in the base 50 for the drawers. The drawers 30, 35 are sized appropriately to hold the particular objects they are intended to receive—unfinished lollipops or garbage. Drawers 30, 35 include switches 310, 320 (shown in FIG. 6) for causing a response in the carousel holder 10, as described further below.

Figure 6:
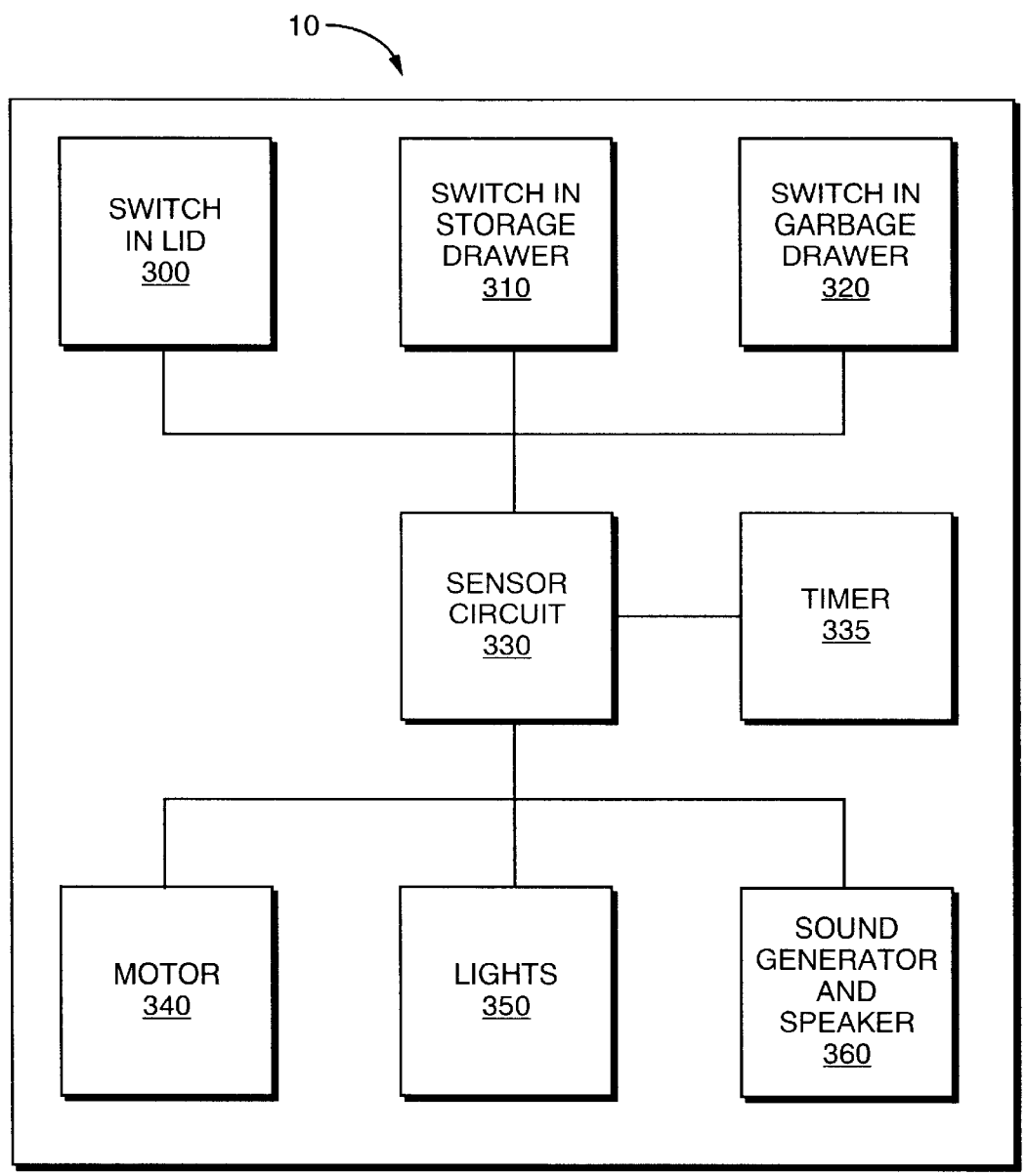
FIG. 6 is a schematic diagram of a mechanism for generating responses in each of the lollipop holders of FIGS. 1–5.

The carousel holder 10 includes a switch 300 activated by removing and replacing the lid 20. Referring to FIG. 6, the lid switch 300 is connected to a motor 340 for rotating the upper portion 40 of the carousel 10 relative to the base 50. The lid switch 300 also activates a sound generator driving a speaker 360 to produce a sound, such as carousel music while the motor 340 rotates the upper portion 40. Lights 350 positioned around the carousel holder 10 may also be activated by the lid switch 300. The lid switch 300 may be connected through a sensor circuit 330 which recognizes the lid switch 300 being released and pressed by the removal and replacing of the lid 20. The sensor circuit 330 further includes a timer 335 for limiting the amount of time that any one of the animated responses will remain active. The motor 340, lights 350 and sound generator and speaker 360 can all be connected to the sensor circuit 330.

The storage drawer switch 310 and garbage drawer switch 320 can also be connected to the sensor circuit 330. The sensor circuit 330 can contain logic for determining which switch 300, 310, 320 has been activated and activating only one or different combinations of the motor 340, lights 350 and sound generator and speaker 360. Alternatively, the sensor circuit 330 can direct different light patterns to be displayed and sounds to be generated depending on which switch is activated.

In the case of the carousel, activating the lid switch 300 by removing and replacing the lid 20 can cause the sensor circuit 330 to activate all three of the motor 340, lights 350 and sound generator and speaker 360. In such case, the carousel 10 will rotate, music will play and lights will blink on and off until the timer 335 expires. Opening the garbage drawer 35 may only cause lights to display and a different sound, such as a digitized "Thank you". Using the storage drawer 30 may cause the motor 340 to run and rotate the carousel 10 and a different musical tune to play on the speaker 360.

Further embodiments of the simulative lollipop holder are shown in FIGS. 2–5. Each of these embodiments includes a similar sensor circuit 330 and switch 300, 310, 320 mechanism as the carousel 10 described above. The motor 340 is used to drive different motions which correspond to the simulative object, while the sound generator and speaker 360 provide relevant music or sounds. The lights 350 can be used in a variety of ways to illuminate the simulative holders and further enhance the sound and motion effects.

Figure 2:
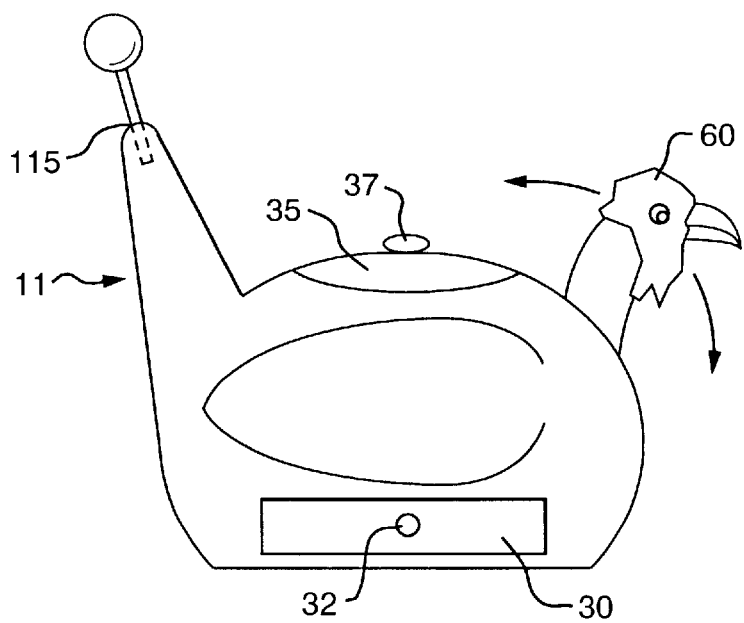
FIG. 2 is a side elevational view of a lollipop holder of the invention simulative of a turkey.

FIG. 2 illustrates a lollipop holder 11 in the form of a turkey having a moving head 60 and receptacles 115 for receiving unused lollipops in the tail of the turkey 11. A storage drawer 30 with handle 32 is provided in the lower portion of the turkey-shaped holder 11. A compartment closed by a lid 35 with handle 37 is provided in the top of the turkey 11. The receptacles 115 contain switches 300 which are activated when a lollipop 100 is removed to cause the head 60 to move and a turkey noise to be generated. The eyes may be lighted as well. Using the storage drawer 30 and garbage lid 35 can also generate similar responses.

Figure 3:
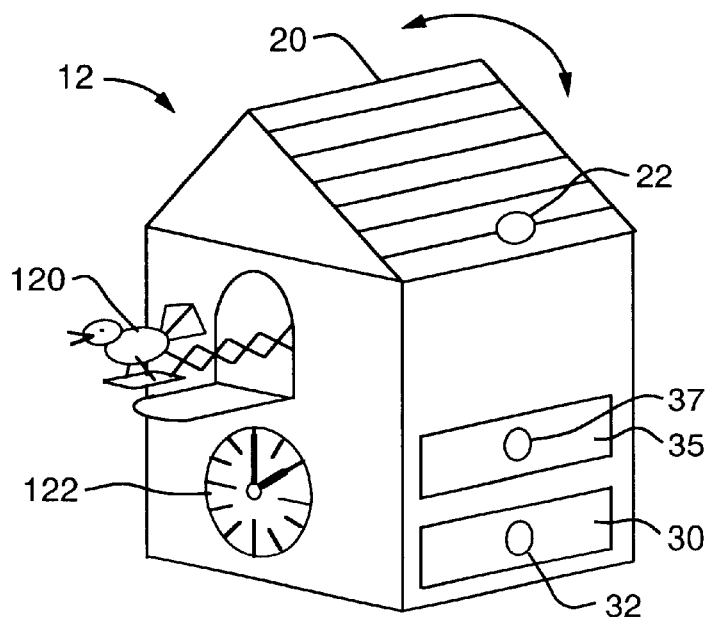
FIG. 3 is a perspective view of a lollipop holder of the invention simulative of a cuckoo clock.

FIG. 3 shows a cuckoo clock lollipop holder 12 having a hinged roof lid 20 and storage and garbage drawers 30, 35, respectively. Each of the lid 20 and drawers 30, 35 have a handle 22, 32, 37 for opening by pulling. New lollipops can be stored in a compartment closed by the roof lid 20. When the roof lid 20 is opened and closed, the sensor circuit 330 will cause the cuckoo bird 120 to move in and out of its housing and the clock hands to rotate. A cuckoo clock chime can be activated and the clock dial may light. As with the turkey 11 and carousel 10 holders, using the drawers 30, 35 can generate the same or different combinations of these responses.

Figure 4:
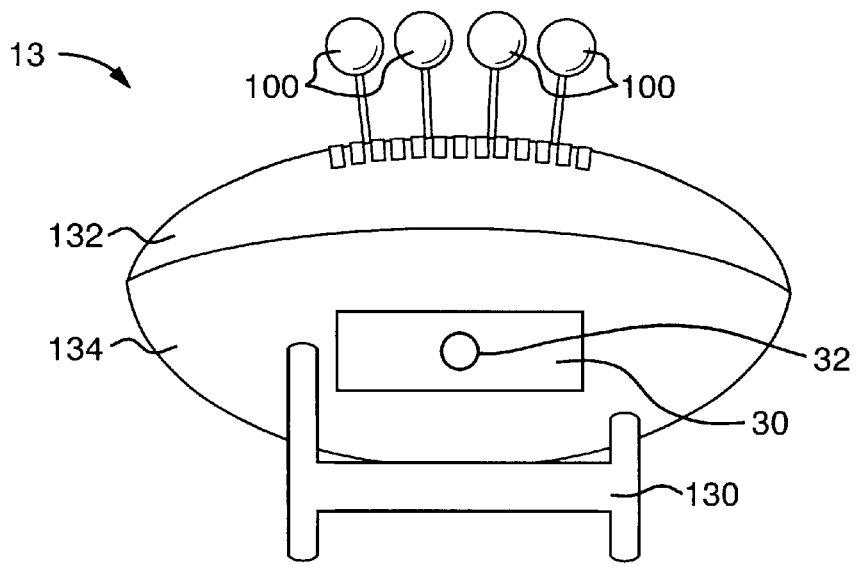
FIG. 4 is a front elevational view of a lollipop holder of the invention simulative of a football.

A lollipop holder simulative of a football 13 resting on a place-kicking tee 130 for support is displayed in FIG. 4. The two halves 132, 134 of the football 13 may separate to reveal a chamber for storing garbage. Several receptacles similar to receptacles 115 on the turkey 12, are provided along the laces 136 of the football for holding lollipops 100. A storage drawer is provided in the lower half 134 of the football 13. The football holder 13 includes the switches 300, 310, 320, sensor circuit 330 and timer 335 and lights 350 and sound generator and speaker 360 for producing different responses. Some of the responses include sounds from a football game of fans cheering or an announcer saying different things, such as "Touchdown" in response to using the garbage chamber. Lights 350 may be positioned around the football holder 13 to provide a display.

Figure 5:
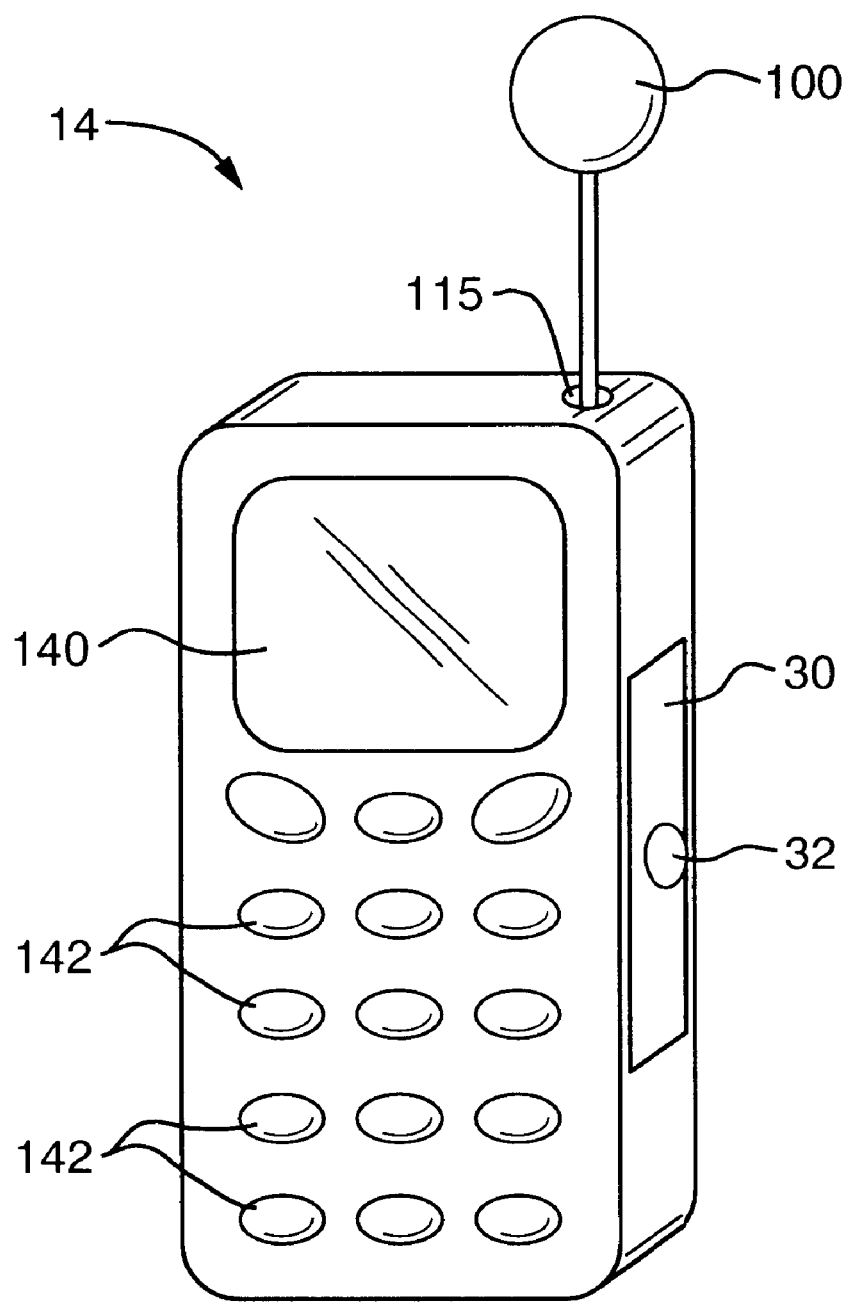
FIG. 5 is a perspective view of a lollipop holder of the invention simulative of a cellular telephone.

FIG. 5 shows a lollipop holder simulative of a cellular phone 14 having a display screen 140 and buttons 142. A drawer 30 for storage of partly used lollipops is provided in the side of the cellular phone holder 14. A lollipop 100 is held in receptacle 115 containing a switch 300 for activating a response in the holder 14, such as the buttons 142 lighting up and a display appearing on the screen 140, while a dialing sound and voice are produced by the speaker 360. Using the storage drawer can produce other similar responses appropriate to the simulative cellular phone 14.

The animated responses from the simulative holders can be used to provide positive reinforcement to a child for using the holder and encourage use of the holder. The holder provide a sanitary means for disposing of garbage from lollipops and for temporarily storing partly used lollipops. The holders are useful because they can be carried to other locations for use, such as at a park, on a picnic, at school or in a car. The garbage is stored in one location while the partly used lollipop is stored in a second location which is sanitary, especially compared to the local surroundings. Thus, a partly used lollipop does not have to be placed on the ground or on other unclean or unsanitary surfaces. The holders are especially useful for children to help prevent disease from unsanitary contact of the lollipop with such surfaces. At the same time, the holders can amuse children.

While a specific embodiment of the invention has been shown and described in detail to illustrate the application of the principles of the invention, it will be understood that the invention may be embodied otherwise without departing from such principles.

What is claimed is:

1. A lollipop holder comprising:
   a holder body having an outward appearance simulative of an object;
   a storage drawer in the holder body for receiving partly used lollipops;
   at least one receptacle for holding unused lollipops;
   a first switch operatively connected to at least one receptacle, the first switch changing positions when one of the unused lollipops is removed from the receptacle;
   a second switch operatively connected to the storage drawer in the holder body, the second switch changing positions when the drawer is opened and closed;
   animated response means in the holder body for generating a sound, movement or light display in response to one of the first and second switches changing positions;
   a garbage drawer in the holder body for receiving used lollipop sticks and wrappers; and
   a third switch operatively connected to the garbage drawer in the holder body, the third switch changing positions when the garbage drawer is opened and closed, the animated response means generating a sound, movement or light display in response to the third switch changing positions.

2. A holder according to claim 1, wherein the animated response means comprises a sensor circuit for detecting the first, second and third switches changing position, the sensor circuit operatively connected to a motor, at least one light and a sound generator and speaker.

3. A holder according to claim 2, further comprising a timer connected to the sensor circuit for turning off the response after a fixed period of time.

4. A holder according to claim 1, wherein the animated response means comprises a sensor circuit for detecting the first and second switches changing position, the sensor circuit operatively connected to a motor, at least one light and a sound generator and speaker.

5. A holder according to claim 4, further comprising a timer connected to the sensor circuit for turning off the response after a fixed period of time.

* * * * *